US012805452B2

(12) United States Patent
Park

(10) Patent No.: US 12,805,452 B2
(45) Date of Patent: Nov. 24, 2026

(54) AIR HOUSE FOR SMART FARM

(71) Applicant: Midbar Co., Ltd., Pohang-si (KR)

(72) Inventor: Hae Young Park, Anyang-si (KR)

(73) Assignee: Midbar Co., Ltd., Pohang-si (KR)

( * ) Notice: Subject to any disclaimer, the term of this patent is extended or adjusted under 35 U.S.C. 154(b) by 0 days.

(21) Appl. No.: 18/718,835

(22) PCT Filed: Jun. 1, 2023

(86) PCT No.: PCT/KR2023/007505

§ 371 (c)(1),
(2) Date: Jun. 12, 2024

(87) PCT Pub. No.: WO2024/214863

PCT Pub. Date: Oct. 17, 2024

(65) Prior Publication Data

US 2026/0150793 A1 Jun. 4, 2026

(30) Foreign Application Priority Data

Apr. 11, 2023 (KR) ........................ 10-2023-0047594
May 31, 2023 (KR) ........................ 10-2023-0070133

(51) Int. Cl.
*A01G 9/14* (2006.01)
*A01G 9/02* (2018.01)
(Continued)

(52) U.S. Cl.
CPC ........... *A01G 9/1415* (2013.01); *A01G 9/022* (2013.01); *A01G 9/16* (2013.01); *A01G 9/247* (2013.01); *A01G 9/249* (2019.05); *E04H 5/08* (2013.01)

(58) Field of Classification Search
CPC ...... A01G 9/14; A01G 9/1407; A01G 9/1415; A01G 9/1469; A01G 9/16; A01G 9/225;
(Continued)

(56) References Cited

U.S. PATENT DOCUMENTS 2,754,836 A * 7/1956 William .................. E04H 15/20 52/2.21
2,819,724 A * 1/1958 Barker ...................... E04H 9/16 52/2.18
(Continued)

FOREIGN PATENT DOCUMENTS

CN 108811903 A * 11/2018 ............. A01G 9/023
CN 109661922 A * 4/2019 ........... A01G 31/065
(Continued)

OTHER PUBLICATIONS

KR 101307858 B1 Translation (Year: 2013).*

*Primary Examiner* — Katelyn T Truong
(74) *Attorney, Agent, or Firm* — AJU IP Global PLLC

(57) ABSTRACT

The present disclosure relates to an air house for a smart farm, and more particularly, to an air house for a smart farm, the air house including wall body members (10) and a roof member (20) constituting an outer shape of the house, crop cultivation stages (30) placed in layers at an inner side of the wall body members (10), planting sheets (40) configured to cover each of the crop cultivation stages (30) while spaced apart therefrom, and a water supply device (50) and a lighting device (60) configured to provide conditions necessary for the growth of crops planted in the planting sheets (40), wherein at least the wall body members (10) and the crop cultivation stages (30) are made of a double wall fabric or air tube that allows a three-dimensional framework to be constructed by compressed air.

7 Claims, 7 Drawing Sheets

(51) Int. Cl.
*A01G 9/16* (2006.01)
*A01G 9/24* (2006.01)
*E04H 5/08* (2006.01)

(58) Field of Classification Search
CPC ...... A01G 27/00; A01G 31/06; A01G 31/065; A01G 9/023; A01G 9/026; A01G 9/024; E04H 15/20; E04H 5/08
See application file for complete search history.

(56) References Cited

U.S. PATENT DOCUMENTS

| | | | | | |
|---|---|---|---|---|---|
| 2,854,014 | A * | 9/1958 | Hasselquist | E04H 15/20 441/40 |
| 3,328,926 | A * | 7/1967 | Reinhard | E04H 15/20 52/63 |
| 3,393,479 | A * | 7/1968 | Slotnick | E04H 15/20 52/2.21 |
| 3,432,609 | A * | 3/1969 | Brion, Jr. | H05K 9/0001 428/101 |
| 4,027,437 | A * | 6/1977 | Monsky | E04H 15/20 52/2.21 |
| 4,332,112 | A * | 6/1982 | Hsu | E04H 15/32 52/2.21 |
| 4,352,259 | A * | 10/1982 | Smith | A01G 9/225 47/17 |
| 4,736,762 | A * | 4/1988 | Wayman | A61G 3/001 128/846 |
| 6,269,774 | B1 * | 8/2001 | Stewart | A01G 9/024 47/65.5 |
| 2004/0068926 | A1 * | 4/2004 | Wright | A47G 7/045 47/67 |
| 2005/0091921 | A1 * | 5/2005 | Weder | A47G 7/08 47/72 |
| 2010/0287832 | A1 * | 11/2010 | Felknor | A47G 7/047 47/67 |
| 2012/0247010 | A1 * | 10/2012 | Huber | A01G 9/024 47/29.1 |
| 2013/0031833 | A1 * | 2/2013 | Mackinnon | A01G 9/033 47/65.6 |
| 2015/0150198 | A1 * | 6/2015 | Sinha | A01G 27/00 29/891 |
| 2018/0303041 | A1 * | 10/2018 | Braasch | A47G 7/047 |
| 2019/0082620 | A1 * | 3/2019 | Griffin | A01G 9/247 |
| 2019/0110407 | A1 * | 4/2019 | Su | A01G 27/00 |
| 2022/0061229 | A1 * | 3/2022 | Fields | A47G 7/045 |
| 2024/0284835 | A1 * | 8/2024 | Ankrom, Jr. | A01G 9/1407 |
| 2025/0017148 | A1 * | 1/2025 | Clark | A01G 9/024 |

FOREIGN PATENT DOCUMENTS

| | | | | | |
|---|---|---|---|---|---|
| CN | 110934010 | A | * | 3/2020 | A01G 9/024 |
| DE | 202016102304 | U1 | * | 10/2016 | A01G 9/024 |
| JP | 2009-219456 | A | | 10/2009 | |
| JP | 2020-103121 | A | | 7/2020 | |
| KR | 20-0182265 | Y1 | | 5/2000 | |
| KR | 20-0353437 | Y1 | | 6/2004 | |
| KR | 20080001236 | U | * | 5/2008 | A01G 9/20 |
| KR | 200445708 | Y1 | * | 8/2009 | A01G 9/024 |
| KR | 20120079352 | A | * | 7/2012 | A01G 9/024 |
| KR | 101307858 | B1 | * | 9/2013 | A47G 7/045 |
| KR | 20130129585 | A | * | 11/2013 | A47G 7/044 |
| KR | 10-2014-0063091 | A | | 5/2014 | |
| KR | 10-2014-0076746 | A | | 6/2014 | |
| KR | 20140118497 | A | * | 10/2014 | A01G 27/04 |
| KR | 20150000101 | U | * | 1/2015 | A01G 9/021 |
| KR | 10-1521277 | B1 | | 5/2015 | |
| KR | 10-1526360 | B1 | | 6/2015 | |
| KR | 101726567 | B1 | * | 4/2017 | A01G 27/008 |
| KR | 20250146567 | A | * | 10/2025 | A01G 24/44 |

* cited by examiner

AIR HOUSE FOR SMART FARM

TECHNICAL FIELD

The present disclosure relates to an air house for a smart farm, and more particularly, to an air house for a smart farm, the air house including wall body members (10) and a roof member (20) constituting an outer shape of the house, crop cultivation stages (30) placed in layers at an inner side of the wall body members (10), planting sheets (40) configured to cover each of the crop cultivation stages (30) while spaced apart therefrom, and a water supply device (50) and a lighting device (60) configured to provide conditions necessary for the growth of crops planted in the planting sheets (40), wherein at least the wall body members (10) and the crop cultivation stages (30) are made of a double wall fabric or air tube that allows a three-dimensional framework to be constructed by compressed air.

BACKGROUND ART

A smart farm is an automatic control farm in which the Internet of things (IoT) or information communication technology (ICT) is grafted onto the whole farming process to manage a crop growth environment in an optimal state. In smart farms, crops are mostly cultivated in a typical vinyl greenhouse or glasshouse, but an air house has also been developed in which the framework of the house is formed by injecting compressed air into an air tube or double wall fabric without using iron frames.

For example, as shown in FIG. 7, Korean Utility Model Registration No. 20-0353437 (Jun. 4, 2004) discloses an air vinyl greenhouse in which a plurality of air tubes A-T are formed in parallel between an outer vinyl V1 and an inner vinyl V2, and compressed air is injected into the air tubes A-T to construct the house.

Also, Korean Patent Registration No. 10-1521277 (May 12, 2015) introduces an air house formed of a tunnel-shaped house member made of a double wall fabric. An opening is formed to pass through both side surfaces of the house member, and a support member configured to connect both ends in a width direction is installed at an inlet and an outlet.

Here, the "double wall fabric" is a fabric in which fiber-reinforced yarns of a certain length are densely adhered between two layers of fabric sheets that correspond to each other. Even when compressed air is blown in a space between the fabric sheets at both sides, since the fiber-reinforced yarns hold the fabric sheets at both sides, the double wall fabric maintains a certain thickness in a state in which both surfaces are flat.

DISCLOSURE

Technical Problem

The conventional air house has advantages that installation and removal are easy because an air tube or double wall fabric into which compressed air is injected forms the framework of the house, and an insulation effect is excellent because an air layer serves to perform insulation. However, the conventional air house has an inconvenience that, for the conventional air house to be used in a smart farm, crop cultivation facilities necessary for farming, specifically, crop cultivation stages, have to be separately installed using an iron or wood structure inside the house.

The present disclosure is directed to providing a container type air house for a smart farm in which an outer wall of the air house and crop cultivation stages installed therein are all made of an air tube or double wall fabric such that not only the installation and removal of the air house, but also the transportation and storage of the air house are easy.

The present disclosure is also directed to providing an air house for a smart farm that is configured so that a support structure of crop cultivation stages made of an air tube or double wall fabric and planting sheets installed above the crop cultivation stages is physically sturdy, and particularly, such crop cultivation facilities are suitable for the techniques of aeroponics.

Technical Solution

The present disclosure provides an air house for a smart farm, the air house including: wall body members (10) including a front wall (11) having a door (D), two sidewalls (12), and a rear wall (13), each of which is made of a double wall fabric or air tube; a roof member (20) configured to cover upper surfaces of the wall body members (10) and made of a double wall fabric, an air tube, or a single sheet; crop cultivation stages (30) placed in layers while in contact with the sidewalls (12) of the wall body members (10) and each consisting of a horizontal support portion (31) configured to, in a state in which an outer long side thereof is attached to an inner surface of a sidewall (12*a*) at one side, extend in a horizontal direction toward a sidewall (12*b*) at the other side and a vertical support portion (32) configured to be bent upward from an inner long side of the horizontal support portion (31), each of which is made of a double wall fabric or air tube; planting sheets (40) configured to cover upper surfaces of the horizontal support portions (31) of the crop cultivation stages (30) while spaced apart therefrom and each having an outer long side attached to the sidewalls (12), an inner long side attached to upper ends of the vertical support portions (32), and a plurality of planting holes (41) perforated in parallel to each other; and a water supply device (50) and a lighting device (60) configured to provide conditions necessary for the growth of cultivated crops planted in the planting holes (41) of the planting sheets (40).

Advantageous Effects

The air house for smart farm according to the present invention is modular in overall appearance with a compact structure like a container for cargo transport, and when the air inside the double wall fabric or air tube is evacuated, all components can be easily folded, so that it can be packaged and sold as a single product, and furthermore, it is very easy to transport and store.

In addition, at the installation site, the wall body members (10) and the roof member (20), as well as the multi-layer crop cultivation stages (30), which is an internal cultivation facility, can be constructed simultaneously by injecting compressed air into the double space paper or air tube, and the air house for the smart farm can be completed within a few hours by installing the planting sheets (40), water supply device (50), and lighting device (60).

Furthermore, the air house for smart farm according to the preferred embodiment of the present invention is particularly suitable for aeroponics farming, as the crop cultivation stages (30) and the planting sheets (40) are arranged in a multilayer structure, and the water supply device (50) and the lighting device (60) provide the necessary conditions for the growth of the crops.

<Description of reference numerals>

| | |
|---|---|
| (10) wall body member | (11) front wall |
| (12, 12a, 12b) sidewall | (13) rear wall |
| (14) V-shaped groove | (20) roof member |
| (30) crop cultivation stage | (31) horizontal support portion |
| (32) vertical support portion | (33) level maintenance strap |
| (34) single sheet portion | (40) planting sheet |
| (41) planting hole | (50) water supply device |
| (51) spraying nozzle | (52) storage tank |
| (53) water supply tube | (54) water discharge tube |
| (55) seedling raising tray | (60) lighting device |

MODES OF THE INVENTION

Hereinafter, the present disclosure will be described in detail using the accompanying drawings. However, the accompanying drawings only illustrate exemplary embodiments of the present disclosure, and thus the scope of rights of the present disclosure is not limited by these embodiments. Also, even for configurations essential to carrying out the present disclosure, detailed description of those introduced in the related art or those that can be easily carried out by those of ordinary skill in the art from known art will be omitted.

Also, the term "portion" or "device" included in the names of some components belonging to the present disclosure refers to a unit of processing at least one common function or operation that may be implemented by hardware, software, or a combination thereof. Also, "including" a certain component means that another component may be further included as necessary, in addition to the stated component.

Figure 1:
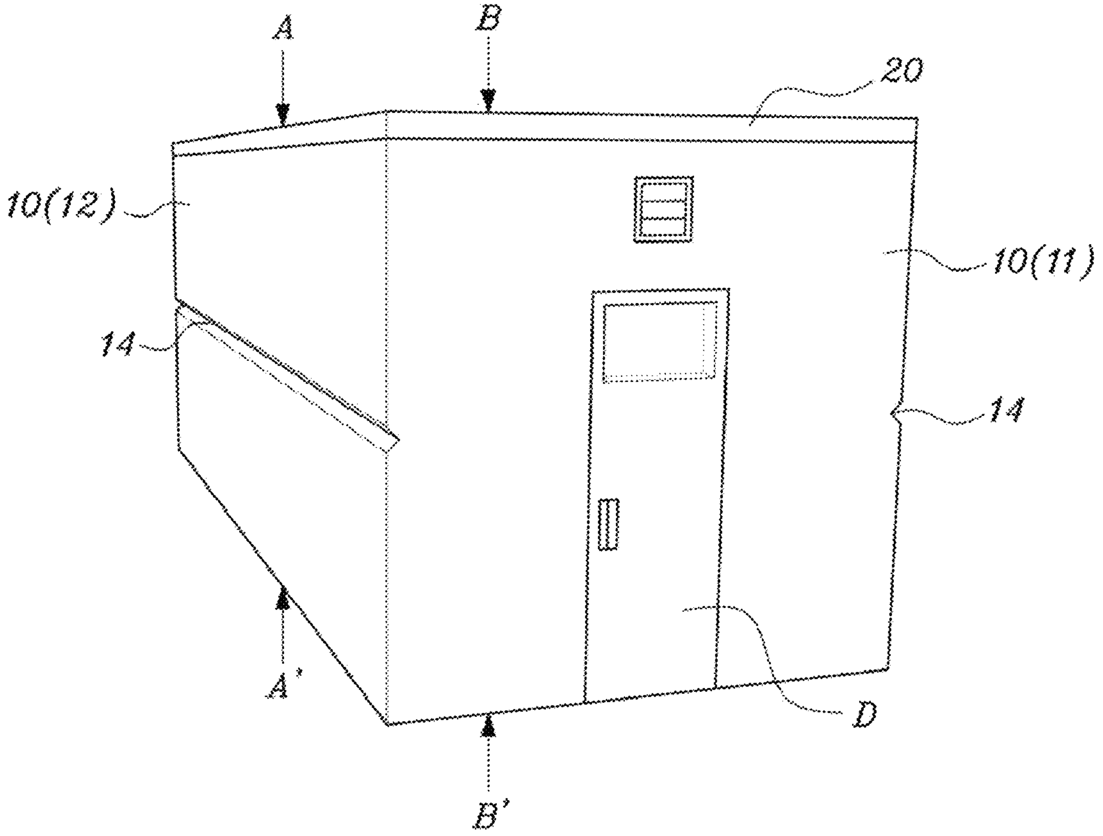
FIG. 1 is a perspective view of an air house for a smart farm according to one embodiment of the present disclosure.
Figure 2:
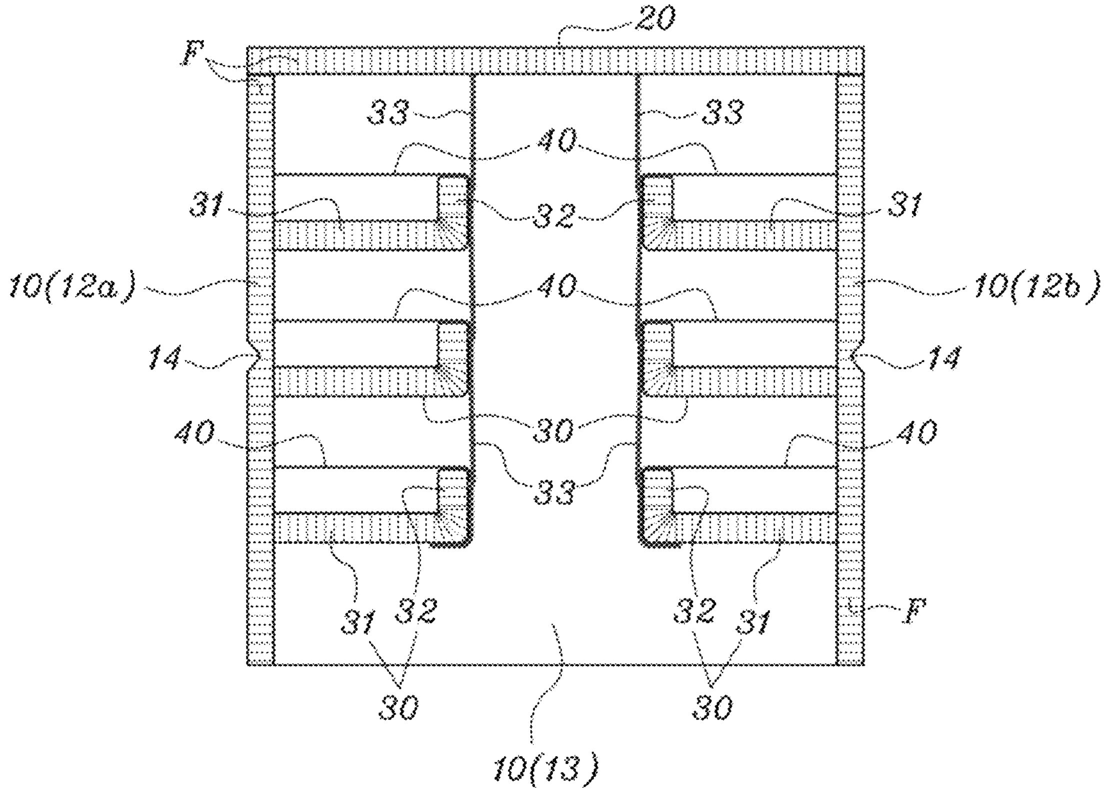
FIG. 2 is a cross-sectional view along line A-A' of FIG. 1.

As shown in FIGS. 1 and 2, an air house for a smart farm of the present disclosure includes wall body members 10 constituting an outer shape of the house, a roof member 20 configured to cover the wall body members 10, crop cultivation stages 30 placed in layers at an inner side of the wall body members 10, planting sheets 40 configured to cover the crop cultivation stages 30 while spaced apart therefrom, and a water supply device 50 and a lighting device 60 configured to provide conditions necessary for the growth of crops planted in the planting sheets 40.

The wall body members 10 and the crop cultivation stages 30 are each made of a double wall fabric or air tube, the roof member 20 is made of a double wall fabric, an air tube, or a single sheet, and the planting sheets 40 are each made of a single sheet. The accompanying drawings illustrate a case in which the wall body members 10, the roof member 20, and the crop cultivation stages 30 are each made of a double wall fabric.

Figure 7:
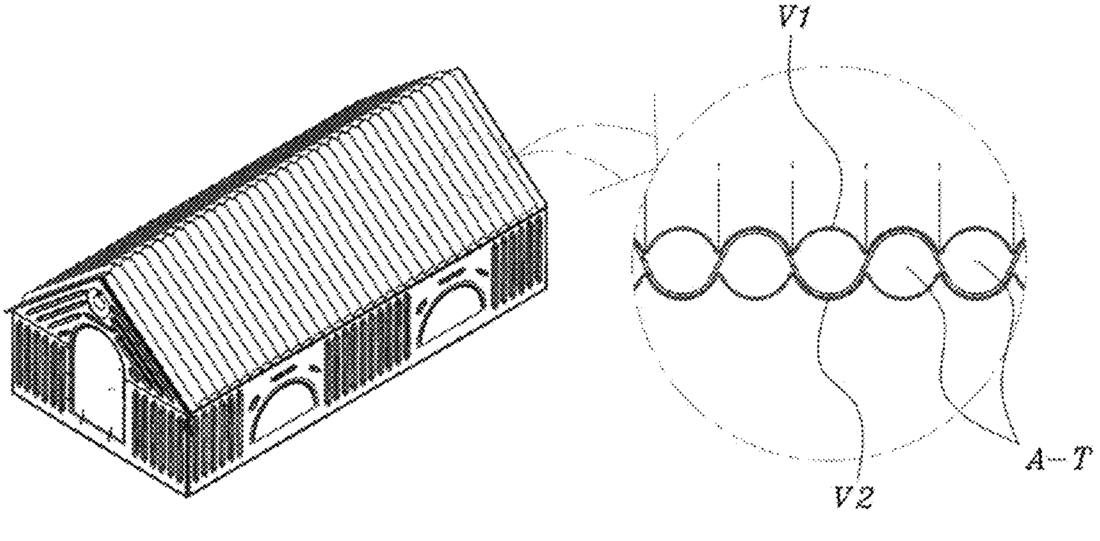
FIG. 7 is a view illustrating the conventional air house made of an air tube.

In the present disclosure, the "double wall fabric" is a member in which fiber-reinforced yarns F of a certain length are densely adhered to allow compressed air to be injected in between one layer of a single sheet and another layer of a single sheet as shown in FIG. 2, and the "air tube" is a member in which a plurality of air tubes are formed in parallel to allow compressed air to be injected in between one layer of a single sheet and another layer of a single sheet as shown in FIG. 7. Also, the single sheet is a typical single-layer sheet, but this does not mean that a cross-section thereof has a single-layer structure.

First, the wall body members 10 consist of a front wall 11 having a door D, sidewalls 12 each bent from both vertical sides of the front wall 11, and a rear wall 13 facing the front wall 11. That is, the front wall 11, the sidewalls 12, and the rear wall 13 form a quadrangular structure and are each made of a double wall fabric or air tube.

An air inlet (not illustrated in the drawings) is installed at a suitable position of the wall body members 10 to allow compressed air to be injected into the double wall fabric or air tube. Also, in the front wall 11, the sidewalls 12, and the rear wall 13, air passages may be connected to each other so that air injected into the double wall fabric or air tube is able to pass therethrough or may be disconnected from each other.

In a case in which the air passages for air injected into the double wall fabric or air tube are connected to each other, it is convenient because compressed air can be injected with a uniform pressure into the front wall 11, the sidewalls 12, and the rear wall 13 through a single air inlet. Also, in a case in which the air passages are disconnected from each other, there is an advantage that, even when any one of the front wall 11, the sidewalls 12, and the rear wall 13 is damaged, the three-dimensional shape of the house is provisionally maintained due to the undamaged sides.

According to an exemplary embodiment of the present disclosure, a V-shaped groove 14 is provided in a horizontal direction in outer surfaces of both sidewalls 12 of the wall body members 10. The V-shaped groove 14 makes it easy to fold the wall body members 10 in a state in which air is completely discharged from inside the double wall fabric or air tube. The V-shaped groove 14 may also be provided as a plurality of V-shaped grooves 14. A typical floor member (not illustrated in the drawings) may also be installed at a lower end of the wall body members 10.

Next, the roof member 20 covers upper surfaces of the wall body members 10 and may be made of a double wall fabric or air tube or may be made of a single sheet. In a case in which the roof member 20 is made of a double wall fabric or air tube, an air passage may be connected to or disconnected from the wall body members 10. In a case in which the roof member 20 is made of a single sheet, or an air passage is disconnected between the wall body members 10 and the roof member 20, the roof member 20 may have a structure that is detachable from the wall body members 10.

Also, although a case in which the roof member 20 has the shape of a flat slab is illustrated in the accompanying drawings, the roof member 20 may also be a dome-shaped or triangular roof as necessary. In a case in which the roof member 20 has a dome shape, the wall body members 10 and the roof member 20 may be coupled as one body and constitute a dome-shaped house as a whole.

In the case in which the roof member 20 is made of a single sheet, the roof member 20 may have the shape of a slab so that using a separate structure is not necessary. In the case in which the roof member 20 has the shape of a slab, the air house for a smart farm of the present disclosure has a rectangular parallelepiped exterior similar to a freight-carrying container as a whole.

The crop cultivation stages 30 are placed in layers while in contact with the sidewalls 12 of the wall body members 10 and each consist of a horizontal support portion 31 and a vertical support portion 32, each of which is made of a double wall fabric or air tube. A length of the crop cultivation stage 30 may be equal to a length of the sidewall 12, and both ends of the crop cultivation stage 30 in a longitudinal direction thereof, that is, both short sides of the crop cultivation stage 30, may be attached to and supported by the front wall 11 and the rear wall 13.

The horizontal support portion 31 has a rectangular shape that longitudinally extends with a predetermined width, and in a state in which an outer long side of the horizontal support portion 31 is supported by an inner surface of a sidewall 12*a* at one side, the horizontal support portion 31 extends in a horizontal direction toward a sidewall 12*b* at the other side. Also, the vertical support portion 32 is bent upward as much as a predetermined height from an inner long side of the horizontal support portion 31.

Although a structure in which the crop cultivation stages 30 are placed in three layers is illustrated in the accompanying drawings, the number of layers of the crop cultivation stages 30 may be appropriately controlled according to the type of cultivated crop or the site situation. Also, the crop cultivation stages 30 may be placed at both sidewalls 12*a* and 12*b* or may be placed at only one of the sidewalls 12*a* and 12*b*.

In a case in which the crop cultivation stages 30 are placed at both sidewalls 12*a* and 12*b*, workers may move through a space between the vertical support portions 32 at both sides. Also, in a case in which the crop cultivation stages 30 are placed only at one sidewall 12*a*, workers may move through a space between the vertical support portion 32 of the crop cultivation stage 30 and the other sidewall 12*b*.

A level maintenance strap 33 configured to support a load of the crop cultivation stages 30 may be installed at the vertical support portion 32. The level maintenance strap 33 has an upper end hung on the roof member 20 in a state in which the level maintenance strap 33 supports the load so that the vertical support portion 32 remains level as a whole. The level maintenance strap 33 may be attached to the vertical support portion 32 by a hook-and-loop fastener tape to allow horizontality of each crop cultivation stage 30 to be adjusted at any time. A lower end of the level maintenance strap 33 may be supported by the vertical support portion 32 of the crop cultivation stage 30 at the lowermost layer or may be supported by a bottom surface of the house.

In the present disclosure, in place of the level maintenance strap 33, a horizontal support (not illustrated in the drawings) configured to support the load of the crop cultivation stages 30 may be installed. The horizontal support may have a structure in which a lower end thereof is supported by the ground in a state in which the horizontal support supports the load of each crop cultivation stage 30. The number of level maintenance straps 33 or horizontal supports may be appropriately selected according to the length and load of the crop cultivation stages 30.

In the wall body members 10 and the crop cultivation stages 30, air passages may be connected to each other. In this way, when compressed air is injected into the wall body member 10, compressed air is also injected into the crop cultivation stage 30. Therefore, according to the present disclosure, basic frameworks of outer walls of the house and internal cultivation facilities necessary for a smart farm can be simultaneously constructed through a simple task of injecting compressed air into the wall body members 10.

Next, the planting sheets 40 cover upper surfaces of the horizontal support portions 31 of the crop cultivation stages 30 while spaced a predetermined distance apart from the horizontal support portions 31. Unlike the crop cultivation stages 30, the planting sheets 40 are each made of a single sheet. The planting sheet 40 has a rectangular shape longitudinally extending with the same width as the horizontal support portion 31 and has an outer long side attached to the sidewalls 12 and an inner long side attached to an upper end of the vertical support portion 32. Both short sides of the planting sheet 40 may be attached to and supported by the front wall 11 and the rear wall 13.

Figure 3:
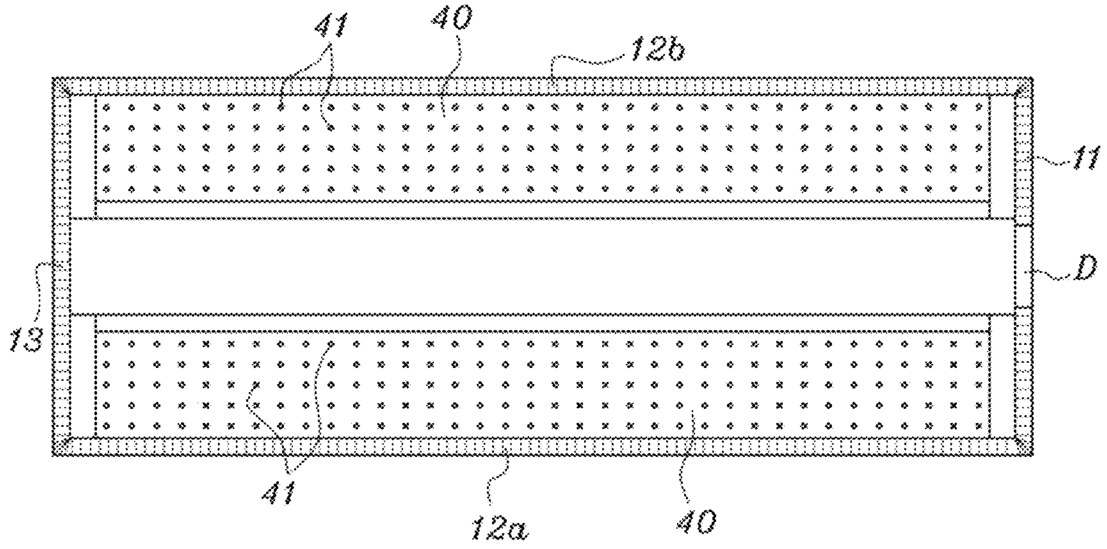
FIG. 3 is a plan view illustrating a configuration of planting sheets 40 according to one embodiment of the present disclosure.

Therefore, between the horizontal support portion 31 and the planting sheet 40, a space is formed due to the horizontal support portion 31 and the planting sheet 40 being spaced apart from each other as much as the height of the vertical support portion 32. Also, a plurality of planting holes 41 are perforated in parallel to each other in the planting sheet 40 to allow cultivated crops to be planted as shown in FIG. 3. The sizes of the planting holes 41 and intervals therebetween may be appropriately adjusted according to the type of cultivated crops. Stems and leaves of crops planted in the planting holes 41 are placed on the planting sheet 40, and roots of the crops are placed in the space between the horizontal support portion 31 and the planting sheet 40.

An inner long side of the planting sheet 40 may be attached to surround the upper end of the vertical support portion 32 by a hook-and-loop fastener tape. In this way, by attaching the inner long side of the planting sheet 40 to the vertical support portion 32 in a state in which the planting sheet 40 is pulled taut and unfolded to be flat, the crop cultivation stage 30 and the planting sheet 40 may support each other and maintain a more stable level state.

The water supply device 50 supplies water and nutrients necessary for the growth of crops planted in the planting holes 41 of the planting sheets 40 and may be appropriately selected from conventional water supply devices according to the type of cultivated crops and farming method.

Considering that the air house for a smart farm according to the present disclosure has a structure in which the overall framework is supported by compressed air injected into a double wall fabric or air tube, the techniques of aeroponics in which a burden due to load is relatively low may be proposed. In the techniques of aeroponics, a minimum amount of water and nutrient solution is supplied using a spray in a state in which roots of crops are exposed in the air. For such a purpose, the water supply device 50 may include a spraying nozzle 51, a storage tank 52, and a water supply tube 53.

Figure 4:
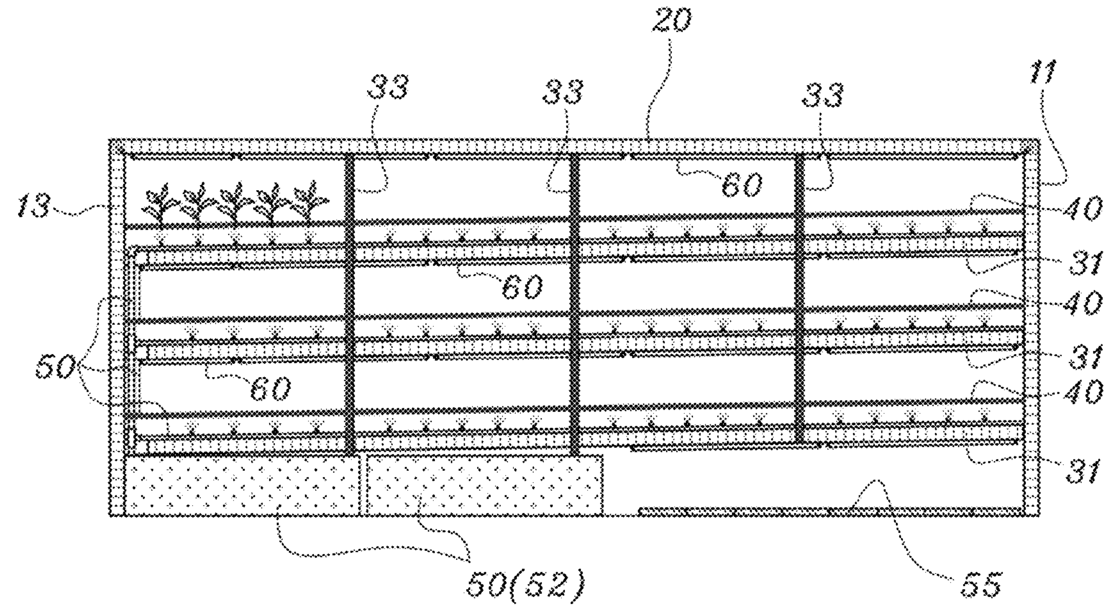
FIG. 4 is a cross-sectional view along line B-B' of FIG. 1.
Figure 5:
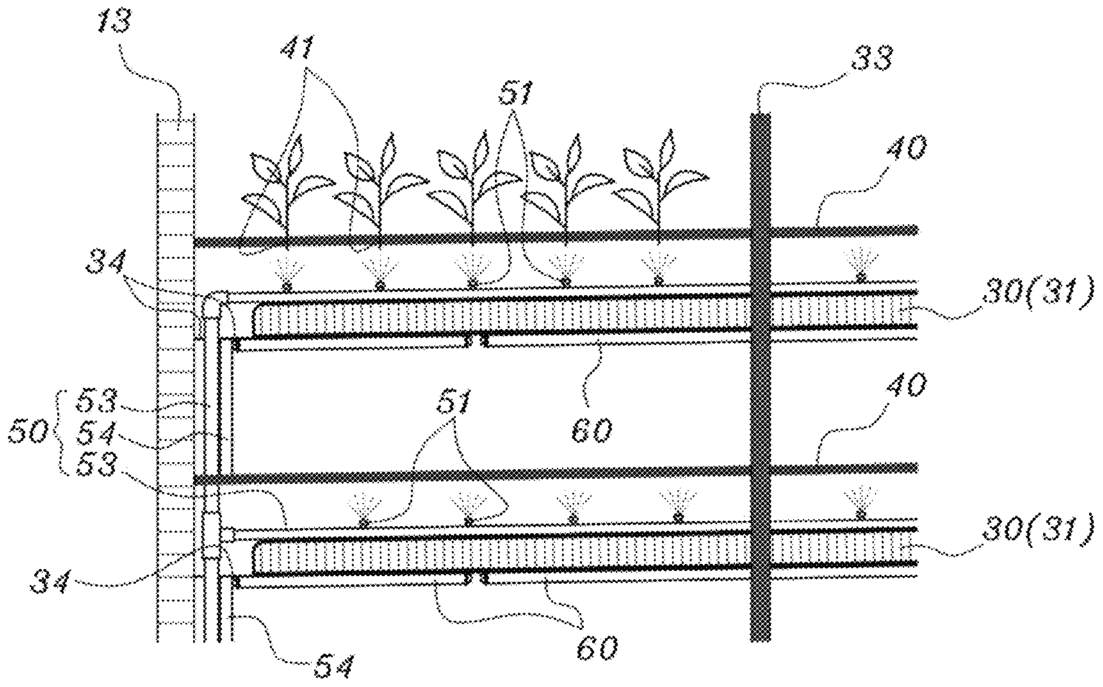
FIG. 5 is an enlarged view illustrating a configuration of a water supply device 50 and a lighting device 60.
Figure 6:
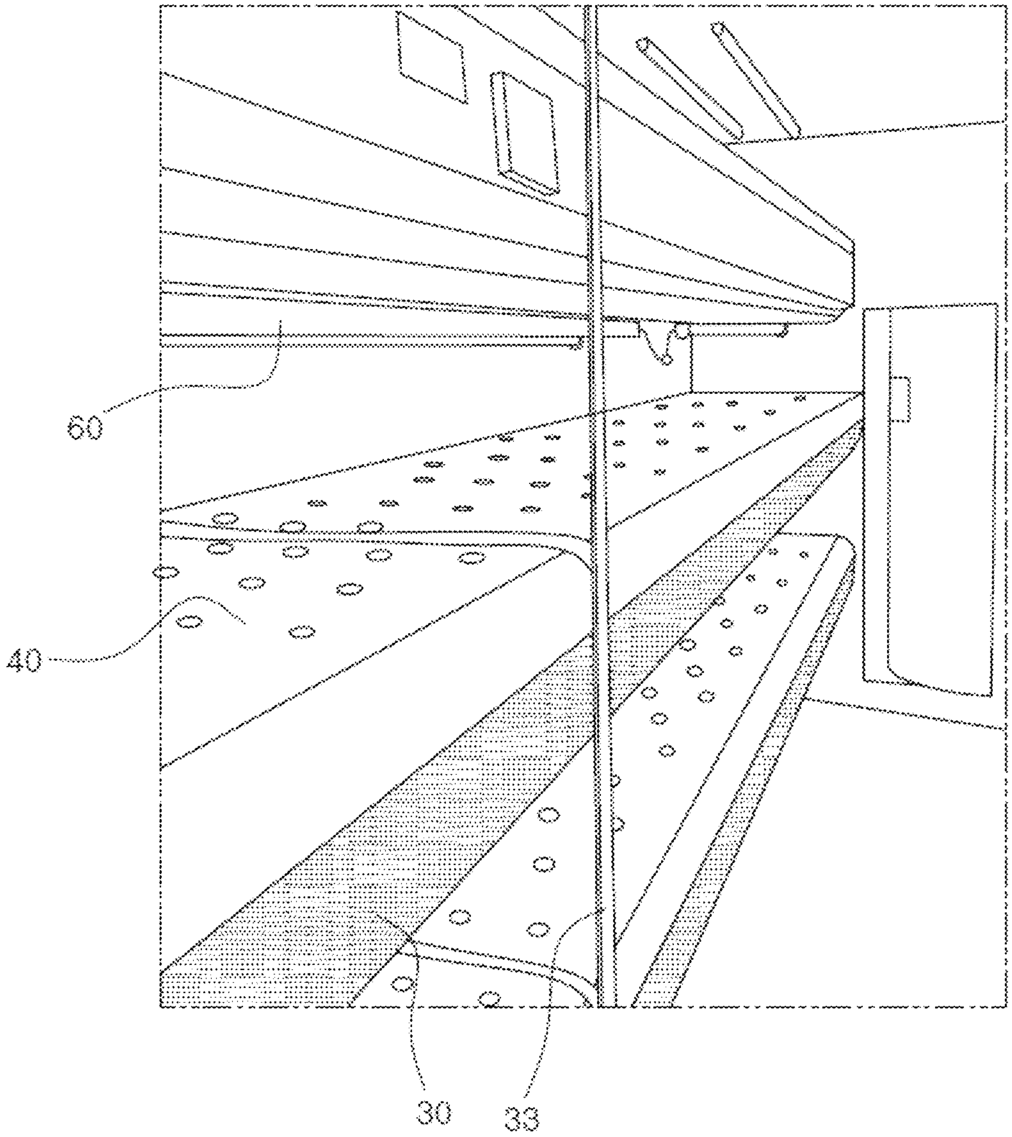
FIG. 6 is an actual picture of an inside of the air house for a smart farm according to one embodiment of the present disclosure.

As shown in FIGS. 4 and 5, the spraying nozzle 51 is installed between the horizontal support portion 31 of the crop cultivation stage 30 and the planting sheet 40 and sprays water and a nutrient solution toward roots of crops planted in the planting holes 41. The storage tank 52 stores water and a nutrient solution supplied to the spraying nozzle 51 and may be disposed on the ground under the lowermost crop cultivation stage 30. Also, the water supply tube 53 connects the spraying nozzle 51 and the storage tank 52 to each other.

Meanwhile, in the crop cultivation stage 30 of each layer, a single sheet portion 34 from which a double wall fabric or air tube is removed to allow passage of the water supply tube 53 in an up-down direction may be provided at one side of the horizontal support portion 31. Also, a water discharge tube 54 configured to discharge water stagnating on the horizontal support portion 31 is installed at the single sheet portion 34. As shown in FIG. 4, the horizontal support portion 31 may have a downward slope toward the single sheet portion 34 to facilitate drainage of water. The water supply tube 53 may be connected to the crop cultivation stage 30 of each layer by a single line, but the water discharge tube 54 may be installed to have different lines for the horizontal support portion 31 of each layer.

Lastly, the lighting device 60 radiates light necessary for the growth of crops planted in the planting holes 41 of the planting sheets 40 and may be installed on each of a bottom surface of the roof member 20 and bottom surfaces of the horizontal support portions 31 of the crop cultivation stages 30. A typical linear light emitting diode (LED) may be used as the lighting device 60, which may be installed to be attachable and detachable using a hook-and-loop fastener tape, a magnet, or the like.

As shown in FIG. 4, together with the storage tank 52, a seedling raising tray 55 configured to grow cultivated crops to be transplanted to the planting sheets 40 may be disposed under the crop cultivation stage 30 at the lowermost layer. Also, for the seedling raising tray 55, the lighting device 60 may also be installed at the bottom surface of the horizontal support portion 31 at the lowermost layer. The water supply device 50 and the lighting device 60 may be automatically controlled by a separate controller (not illustrated in the drawings).

All the components of the air house for a smart farm according to the present disclosure may be packaged in a single product box and sold to a user or delivered to an installation site. Also, at an installation site, first, compressed air may be injected into a double wall fabric or air tube constituting the wall body members 10, the roof member 20, and the crop cultivation stages 30, and then the planting sheet 40, the water supply device 50, and the lighting device 60 may be installed at each of the crop cultivation stages 30 to easily construct the air house for a smart farm within hours.

An air house for a smart farm according to the present disclosure has an overall outer shape modularized in a compact structure like a freight-carrying container, and when air inside a double wall fabric or air tube is discharged, all components of the air house can be easily and conveniently folded. Thus, there are advantageous effects that the air house can be packaged and sold as a single product, and further, the transportation and storage of the air house are extremely easy.

Also, on an installation site, not only wall body members 10 and a roof member 20, but also multiple layers of crop cultivation stages 30 which are internal cultivation facilities can be simultaneously constructed through a simple task of injecting compressed air into a double wall fabric or air tube, and by installing planting sheets 40, a water supply device 50, and a lighting device 60 here, the air house for a smart farm can be completed within hours.

In addition, since the crop cultivation stages 30 and the planting sheets 40 are arranged in multi-layer structures, and the water supply device 50 and the lighting device 60 configured to provide conditions necessary for the growth of cultivated crops are provided in the air house for a smart farm according to an exemplary embodiment of the present disclosure, the air house is extremely suitable especially for the techniques of aeroponics.

Those of ordinary skill in the art may easily attempt to change the design of the present disclosure. For example, an intermediate wall (not illustrated in the drawings) may be installed between the sidewalls 12 of the wall body members 10, and one side of the crop cultivation stage 30 and one side of the planting sheet 40 may be installed to be supported by coming in contact with the intermediate wall. However, such design changes should also be considered as falling within the scope of rights of the present disclosure.

The invention claimed is:

1. An air house for a smart farm, the air house comprising:

wall body members including a front wall having a door, two sidewalls, and a rear wall, each of which is made of a double wall fabric or air tube;

a roof member configured to cover upper surfaces of the wall body members and made of a double wall fabric, an air tube, or a single sheet;

crop cultivation stages placed in layers while in contact with the sidewalls of the wall body members and each consisting of a horizontal support portion configured to, in a state in which an outer long side thereof is attached to an inner surface of a sidewall at one side, extend in a horizontal direction toward a sidewall at the other side and a vertical support portion configured to be bent upward from an inner long side of the horizontal support portion, each of which is made of a double wall fabric or air tube;

planting sheets configured to cover upper surfaces of the horizontal support portions of the crop cultivation stages while spaced apart therefrom and each having an outer long side attached to the sidewalls, an inner long side attached to upper ends of the vertical support portions, and a plurality of planting holes perforated in parallel to each other; and a water supply device and a lighting device configured to provide conditions necessary for the growth of cultivated crops planted in the planting holes of the planting sheets, wherein the water supply device includes a spraying nozzle installed between the horizontal support portion of the crop cultivation stages and the planting sheet to spray water and a nutrient solution toward roots of crops planted in the planting holes, a storage tank configured to store the water and the nutrient solution supplied to the spraying nozzle, and a water supply tube configured to connect the spraying nozzle and the storage tank to each other, wherein the horizontal support portion includes, at one side thereof, a single sheet portion through which the water supply tube passes, the single sheet portion being free of a double wall fabric or the air tube, and a water discharge tube configured to discharge water stagnating on the horizontal support portion is installed at the single sheet portion.

2. The air house of claim 1, wherein a V-shaped groove is provided in a horizontal direction in outer surfaces of both sidewalls of the wall body members to allow the wall body members to be easily folded in a state in which air is discharged from inside the double wall fabric or air tube.

3. The air house of claim 1, wherein air passages of the double wall fabric or air tube are connected to each other in the wall body members and the crop cultivation stages.

4. The air house of claim 1, wherein a level maintenance strap or a horizontal support configured to support a load of the crop cultivation stages is installed at the vertical support portions of the crop cultivation stages.

5. The air house of claim 4, wherein the level maintenance strap is attached to the vertical support portions by a hook-and-loop fastener tape and has an upper end hung on the roof member.

6. The air house of claim 1, wherein an inner long side of the planting sheet is attached to the vertical support portion by a hook-and-loop fastener tape.

7. The air house of claim 1, wherein the lighting device is installed to be attachable to and detachable from each of a bottom surface of the roof member and bottom surfaces of the horizontal support portions.

* * * * *